(12) United States Patent
Mantha et al.

(10) Patent No.: US 11,936,504 B1
(45) Date of Patent: Mar. 19, 2024

(54) SYSTEM FOR A DECISION FEEDBACK EQUALIZER

(71) Applicant: Ceremorphic, Inc., San Jose, CA (US)

(72) Inventors: Ajay Mantha, Hyderabad (IN); Poorna Chandrika Kondeti, Hyderabad (IN)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 17/829,070

(22) Filed: May 31, 2022

(51) Int. Cl.
*H04L 25/03* (2006.01)
(52) U.S. Cl.
CPC .. *H04L 25/03025* (2013.01); *H04L 25/03885* (2013.01); *H04L 2025/0349* (2013.01)
(58) Field of Classification Search
CPC ......... H04L 25/03006; H04L 25/03019; H04L 25/03025; H04L 25/03057; H04L 25/03878; H04L 25/03885; H04L 2025/0349
USPC ........ 375/232, 233, 346, 348, 350; 708/322, 708/323
See application file for complete search history.

(56) References Cited

U.S. PATENT DOCUMENTS

| | | | | |
|---|---|---|---|---|
| 6,532,273 B1* | 3/2003 | Mobin | ............... | H03H 17/0664 708/316 |
| 9,401,800 B1* | 7/2016 | Kang | .................... | H04L 7/0062 |
| 11,323,117 B1* | 5/2022 | Tanguay | .............. | H03K 19/096 |
| 2014/0056345 A1* | 2/2014 | Dickson | ........... | H04L 25/03057 375/233 |
| 2017/0295039 A1* | 10/2017 | Hidaka | ............. | H04L 25/03267 |
| 2018/0248577 A1* | 8/2018 | Hossain | ............ | H04L 25/03057 |
| 2022/0191069 A1* | 6/2022 | Dong | ................ | H04L 25/03057 |

* cited by examiner

*Primary Examiner* — Young T. Tse
(74) *Attorney, Agent, or Firm* — Minisandram Law Firm; Raghunath S. Minisandram

(57) ABSTRACT

A decision feedback equalizer includes a summer, a slicer, and a feedback circuit. The summer is configured to receive an input signal and a correction signal from the feedback circuit and generate a summer output signal. The slicer includes a first slicer and a second slicer, both are configured to receive the summer output signal as an input, and output a slicer output signal. The feedback circuit is configured to receive the slicer output signal, and based on the slicer output signal, generate the correction signal. The input signal is received at a first clock rate. The first slicer and the second slicer sample the input signal at a second clock rate, about half the first clock rate.

19 Claims, 7 Drawing Sheets

SYSTEM FOR A DECISION FEEDBACK EQUALIZER

RELATED APPLICATION

None

TECHNICAL FIELD

The present invention relates generally to data sampling circuits and more specifically, to a decision feedback equalizer.

DESCRIPTION OF RELATED ART

The advances in the field of digital computing stimulated by the scaling of semiconductor technologies create a demand for higher bandwidth data transmission systems. Despite these rapid advances, the quality and bandwidth of the interconnects has not improved at the same pace. Hence, the limited bandwidth of the interconnects makes it difficult to achieve high speed data transmissions. Due to the low pass nature of the channel, the high-speed data is dispersed resulting in broadening of the pulses at the receiver. These broadened pulses create Inter-Symbol Interference (ISI) severely distorting the received signal which makes accurate recovery of data difficult or merely impossible. Therefore, there exists a need for equalization circuitry that operates at high speeds to meet present day data rates. It is with these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a decision feedback equalizer is disclosed. The decision feedback equalizer includes a summer, a slicer, and a feedback circuit. The summer is configured to receive an input signal and a correction signal from the feedback circuit and generate a summer output signal. The slicer includes a first slicer and a second slicer. Both the first slicer and the second slicer are configured to receive the summer output signal as an input, and output a slicer output signal. The feedback circuit is configured to receive the slicer output signal, and based on the slicer output signal, generate the correction signal. The input signal is received at a first clock rate. The first slicer and the second slicer sample the input signal at a second clock rate, about half the first clock rate.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures.

DETAILED DESCRIPTION

To facilitate an understanding of the adaptive aspects of the present disclosure, an example decision feedback equalizer will be described. The specific construction and operation of the adaptive aspects of various elements of the example decision feedback equalizer will be further described with reference to the decision feedback equalizer.

Figure 1A:
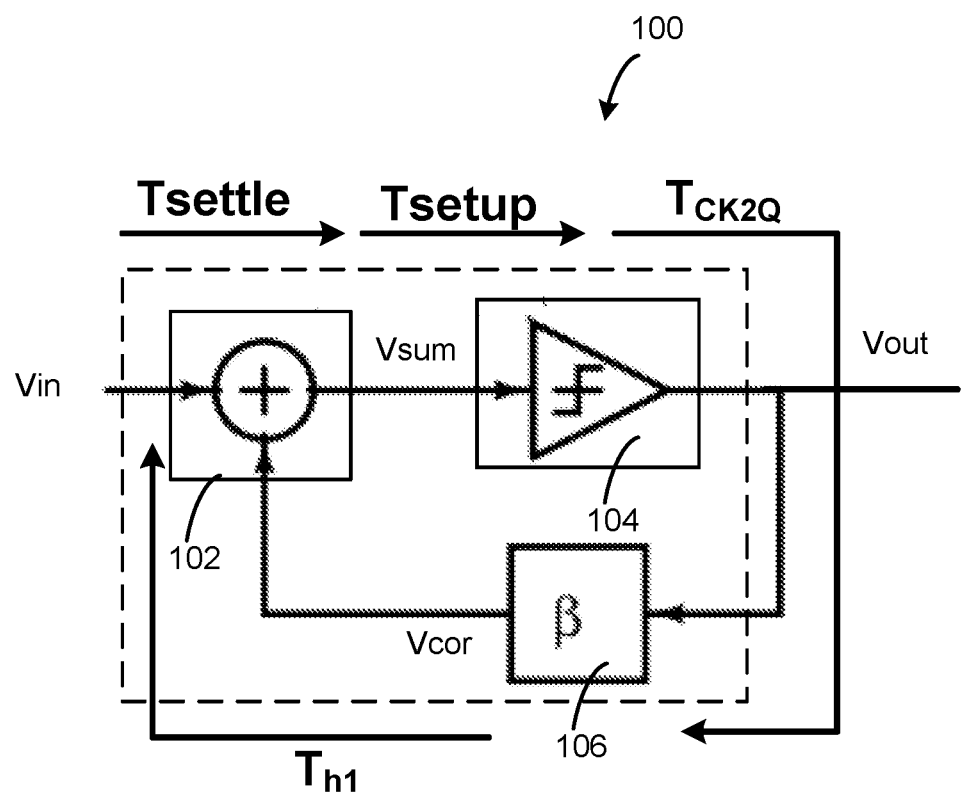
FIG. 1A shows an example decision feedback equalizer, according to one aspect of the present disclosure.

FIG. 1A shows an example decision feedback equalizer (DFE) 100. The decision feedback equalizer 100 includes a summer 102, a slicer 104, and a feedback circuit 106. The summer 102 is configured to receive an input signal Vin from a source, a correction signal Vcorr from the feedback circuit 106 and generate a summer output Vsum. The summer output Vsum is fed as input to the slicer 104 and the slicer outputs a slicer output Vout. The feedback circuit 106 is configured to receive the slicer output Vout and output the correction signal Vcorr. There can be multiple feedback paths (say N) within the feedback equalizer, with first feedback path referred to as $h_1$ and last feedback path referred to as $h_N$.

In general, the timing constraint imposed by the critical path, is given by the timing of the first feedback path $h_1$, by the following equation:

$$T_{CKQ} + T_{h1} + \text{Tsetup} + \text{Tsettle} < 1\,UI \quad \text{Eq. 1}$$

where, $T_{CKQ}$ is the clock-to-Q delay of the slicer, $T_{h1}$ is the delay of the first feedback path $h_1$, Tsetup is the set-up time of the latch, and Tsettle is the settling time of the summer, and 1 UI is the unit interval for one bit period.

In one example, the DFE uses a direct feedback architecture, with the slicer 104 operating at full rate clock. The DFE makes use of an inverter based summer 102 and a track based slicer 104. The inverter-based topology takes full advantage of supply scaling which is a consequence of lower technology nodes. The supply voltages can be adapted with data rates and power savings can be achieved. For example, in PCIE interconnect GEN6 rates are running at 32 GT/s.

However, lower generations such as GEN1 run at 2.5 GT/s. Significant power savings can be achieved by operating GEN6 at say 0.8 volts and GEN1 at 0.4 volts. In one example, outputs of two data slicers operating at half-rate clock are multiplexed by means of a gated differential inverter and full rate data is generated, which eliminates the need for extra summer path. In this example, gated differential inverters are used for multiplexing, which reduces cycle time and power consumption. The track based slicer in this example has a reduced $T_{CKQ}$, which in this case is represented as $T_{CK2Q}$. Further, with inverter based summer, higher bandwidths can be achieved at summing node at lower power, which reduces the settling time Tsettle. This helps in relaxing the timing constraint at high speed. In such an example, the timing constraint imposed by the critical path is given by the equation:

$$T_{CK2Q} + T_{h1} + \text{Tsetup} + \text{Tsettle} < 1 UI \qquad \text{Eq. 2}$$

wherein, $T_{CK2Q}$ is the clock-to-Q delay of the latch in the slicer.

Having generally described the DFE 100 of this current disclosure, various functions and features of the DFE 100 will now be described. Now, referring to FIG. 1B, example DFE 100 is further described.

The DFE 100 includes the summer 102, slicer 104, and the feedback circuit 106. The summer 102 includes an input inverter 110 configured as a transconductor, and a unity inverter 112 configured as a load. The input inverter is configured to receive a differential input VIP and VIM. The output of the input inverter 110 is fed to the input of the unity inverter 112. The output of the unity inverter 112 is fed back to the input of the unity inverter 112. The correction signal from the feedback circuit 106 is also coupled to the output of the unity inverter 112, which is again fed back the input of the unity inverter 112. The summer 102 sums the differential inputs VIP and VIM with the correction signal from the feedback circuit and provides a differential summer output signal SUMP and SUMN, which is fed to the slicer 104. Example construction of a differential inverter for use in the input inverter 110 and the unity inverter 112 will be later described in detail, with reference to FIG. 2A.

The slicer 104 includes a first slicer 114, a second slicer 116, a first slicer inverter 118, and a second slicer inverter 120. In one example, the first slicer inverter 118 and the second slicer inverter 120 are both gated differential inverters. The first slicer 114, and the second slicer 116 both receive the summer output signal SUMP and SUMN. As previously described, the slicer 104 is operating effectively at full clock rate. However, the first slicer 114 and the second slicer 116 are operating at half the clock rate. The output of the first slicer 114 is designated as VP_0, and VM_0 and is fed as input to the first slicer inverter 118. The first slicer 114 resolves the odd bits of the input stream. Similarly, the output of the second slicer 116 is designated as VP_180 and VM_180 and is fed to the second slicer inverter 120. The second slicer 116 resolves the even bits of the input stream. The outputs of the first slicer inverter 118 and the second slicer inverter 120 are combined together and output as VOP and VOM. Example gated differential inverter that may be configured to be used as the first slicer inverter 118 and the second slicer inverter 120 will be later described with reference to FIG. 2A. In some examples, the first slicer inverter 118 and the second slicer inverter 120 may be together referred to as an output slicer 130. Further, functions and features of the first slicer 114 and the second slicer 116 will be later described in detail.

The feedback circuit 106 includes a shift register bank 122, a DFE tap bank 124, and a voltage DAC bank 126. The shift register bank 122 has a plurality of shift registers 1221-122N. The first shift register 1221 receives the output VOP and VOM of the slicer 104, which is shifted through the plurality of shift registers 122I-122N as subsequent outputs are received from the slicer 104. For example, the output VOP and VOM at the next output cycle become VOP1 and VOM1. In other words, if the output of the slicer 104 in the current output cycle is VOP and VOM, VOP1 and VOM1 represent the output of the slicer 104 in the previous output cycle.

The DFE tap bank 124 includes a plurality of DFE taps 1241-124N. The voltage DAC bank 126 has a plurality of voltage DACs 1261-126N. The plurality of voltage DACs 1261-126N are configured to receive selective digital correction codes from an adaptation logic which are selectively fed to the DFE taps 1241-124N respectively, as an analog correction voltage (sometimes referred to as DFE tap correction voltage). The output of the slicer 104 and the output of the shift registers 1221-122N are selectively fed to the plurality of DFE taps 124I-124N, which are used by the plurality of DFE taps 1241-124N to set a polarity for the respective analog correction voltage. For example, output VOP and VOM are fed to DEF tap 1241 and output VOP1 and VOM1 are fed to DEF tap 1242 and so on. All of the outputs of the plurality of DFE taps 1241-124N are fed as correction signal to the summer 102, as previously described. In one example, each of the plurality of DFE taps 1241 to 124N include a pair of gated differential inverters. Now, an example gated differential inverter will be described with reference to FIG. 2A.

Figure 2A:
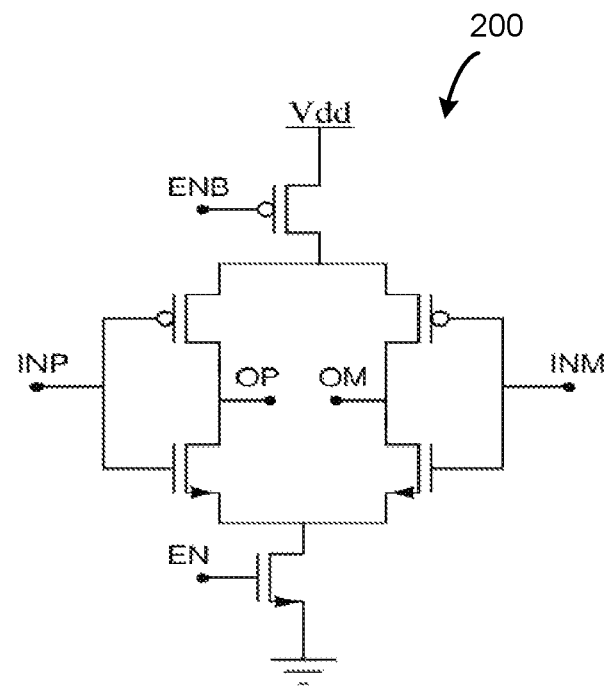
FIG. 2A shows an example differential inverter, for use in the decision feedback equalizer, according to one aspect of the present disclosure.

Referring to FIG. 2A, an example gated differential inverter 200 is described. The gated differential inverter 200 is configured to receive differential inputs INP and INM. In one example, INP is positive and INM is negative. The differential inverter 200 is coupled to a voltage source Vdd and a ground. The differential inverter 200 provides a differential output OP and OM. The differential inverter 200 further has two enable signals, EN and ENB. In some examples, the differential inverter 200 is referred to as a g m cell. The transconductance g m of the differential inverter 200 is equal to Tout/Vin, where input voltage is Vin and output current Tout will be a product of the transconductance g m and input voltage Vin. In other words, the output current Tout of the differential inverter will be proportional to the input voltage of the differential inverter.

Figure 2B:
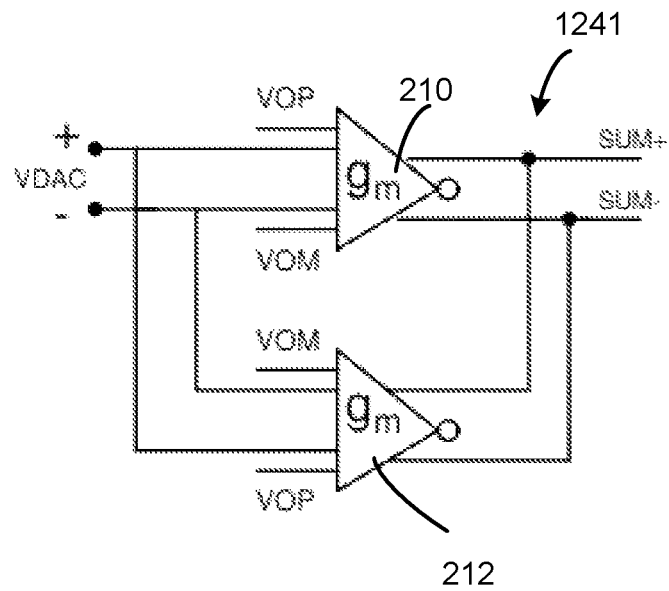
FIG. 2B shows an example pair of differential inverters for use in a DFE tap of the decision feedback equalizer of FIG. 1B, according to one aspect of the present disclosure.

Now, referring to FIG. 2B, an example DFE tap 1241 using a pair of gated differential inverters is shown. The DFE tap 1241 includes a first differential inverter 210 and a second differential inverter 212. The first differential inverter 210 and the second differential inverter 212 are similar in construction to differential inverter 200 previously described with reference to FIG. 2A. The inputs of the first differential inverter 210 and the second differential inverter 212 are coupled to the output of the voltage DAC 1261. The output of the slicer 104, VOP and VOM are used as gating signals and coupled to the enable signals for the first differential inverter 210 and the second differential inverter 212, for example enable signals EN and ENB as previously described with reference to FIG. 2A. The outputs of the first differential inverter 210 and the second differential inverter 212 are coupled together to form correction signal shown as SUM+ and SUM−. Depending upon the value of the VOP and VOM, the polarity of the output correction signal is set. In one example, the first differential inverter 210 provides a positive output and the second differential inverter 212 provides a negative output, and output of only one of the first differential inverter 210 and the second differential inverter 212 is enabled based on the value of the VOP and VOM. As previously mentioned, VOP and VOM act as gating signals to selectively enable one of the first differential inverter 210 and second differential inverter 212. As previously described, the output of the first differential inverter 210 and the second differential inverter 212 is proportional to the voltage of the voltage DAC 1261. Other DFE taps 1241-124N are similarly constructed and receive voltage input from voltage DACs 1262-126N and provide additional correction signals which are all fed to the summer 102, as previously described.

Figure 3A:
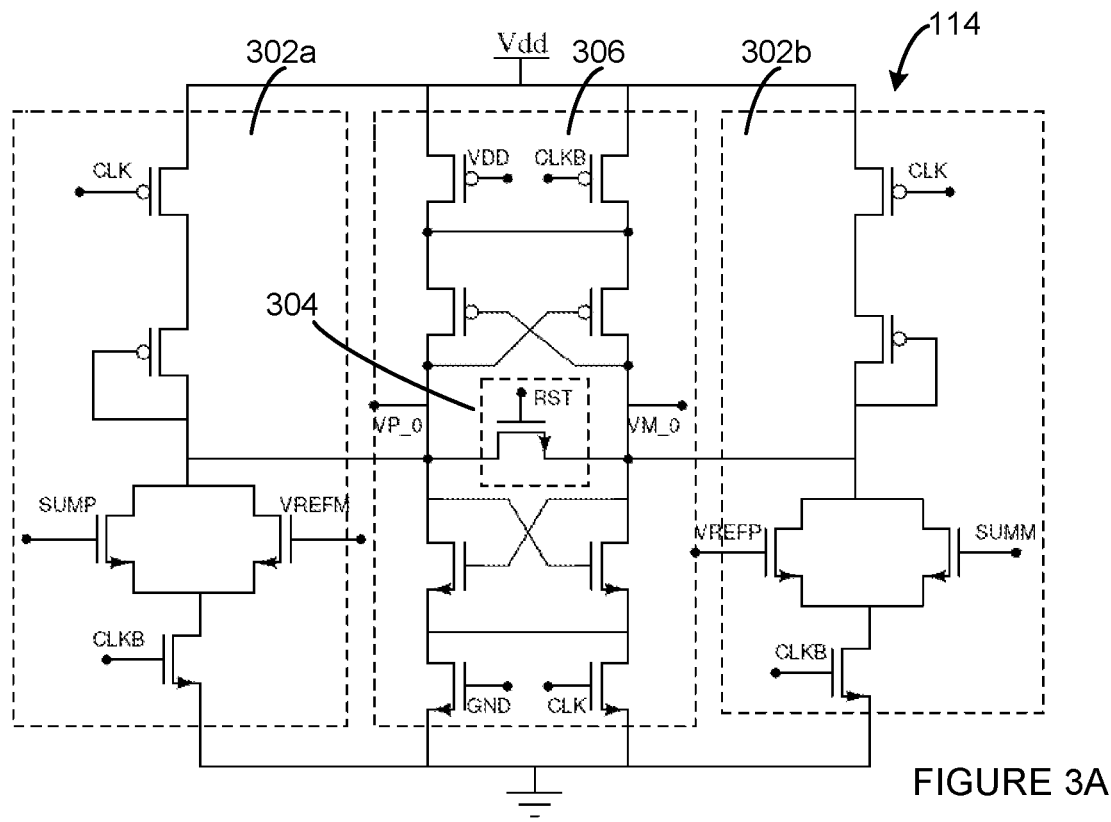
FIG. 3A shows an example first slicer of the decision feedback equalizer of FIG. 1B, according to one aspect of the present disclosure.

Now, referring to FIG. 3A, a slicer, for example, first slicer 114 of the slicer 104 will now be described. In one example, the second slicer 116 is similarly constructed. As previously described, the first slicer 114 and the second slicer 116 are operating at half the clock rate. The first slicer 114 includes a differential input circuit 302a and 302b, a reset circuit 304, and a regeneration circuit 306. The reset circuit 304 is active during a reset phase, the input circuits 302a and 302b are active during a track phase, and the regeneration circuit 306 is active during the regeneration phase.

The reset circuit 304 is active during the reset phase. The reset phase is initiated by a reset pulse RST. In one example, the RST pulse is about half a UI. The reset circuit 304 resets the slicer output voltages to Vdd/2 (mid rail voltage) and readies the first slicer 116 to track new inputs. The input circuits 302a and 302b receive output of the summer 102, for example, outputs SUMP and SUMN as input, respectively. The input circuit 302a further receives a first reference voltage VREFM. The input circuit 302b further receives a second reference voltage VREFP. These reference voltages can be used for offset correction and to set reference values for inputs that may be modulated based on multi-level modulation (for example, PAM4). During the track phase, based on the values of the input to the input circuits 302a and 302b, the output of the input circuits 302a and 302b are tracked to the value proportional to the input, to establish an initial voltage level on the input nodes of the regeneration circuit 306, before regeneration begins. This helps in reducing the delay within the slicer. This tracked output of the input circuits 302a and 302b are then fed to the regeneration circuit 306 as inputs. During the regeneration phase, the inputs to the regeneration circuit 306 is amplified in positive feedback mode, to full rail-to-rail voltage value (Vdd and Gnd) and output as VP_0 and VM_0. The outputs VP_0 and VM_0 are then fed to the gated first slicer inverter 118. All of these operations occur in one full cycle of the half rate clock. In one example, the first slicer 114 starts reset phase at the falling edge of the half rate clock and initiates regeneration phase at the rising edge of the half rate clock and completes the evaluation of the input by the next falling edge of the half rate clock. Similarly, the second slicer 116 starts reset phase at the rising edge of the half rate clock and initiates regeneration phase at the falling edge of the half rate clock and completes the evaluation of the input by the next rising edge of the half rate clock. In one example, the operation of the first slicer 114 is triggered during the trailing edge of the full rate clock.

During reset phase, the CLK is set to zero, CLKB is set to 1 and RST is set to 1. The reset signal RST is a pulse signal, with a pulse width less than 1 UI. When the CLK is low, the input differential pairs and the clocked PMOS transistors turn on. During this phase, when the RST pulse goes high, the output nodes VP_0 will be equal to VM_0, which will be around Vdd/2. This helps in resetting the regeneration nodes of the regeneration circuit 306. When the RST goes low, with the CLK still set to 0, the first slicer 114 enters the track phase. During track phase, the CLK is set to 0, CLKB is set to 1, and RST is set to 0. The output (VP_0-VM_0) will be proportional to (SUMP-SUMM). The output of the input circuits 302a and 302b are tracked to the value proportional to the input, to establish an initial voltage level on the input nodes of the regeneration circuit 306, before regeneration begins. During regeneration phase, the CLK is set to 1, CLKB is set to 0, and RST is set to 0. If SUMP is greater than SUMM, VP_0 will be equal to Vdd and VM_0 will be at ground potential. On the other hand, if SUMP is less than SUMM, VM_0 will be equal to Vdd and VP_0 will be at ground potential.

The second slicer 116 is constructed similar to the first slicer 114. The second slicer 116, receives the output of the summer 102, for example, outputs SUMP and SUMN as input. After the track circuit operates during the track phase, the output of the track circuit is fed to the regeneration circuit of the second slicer 116. The regeneration circuit of the second slicer 116 outputs VP_180 and VM_180. The outputs VP_180 and VM_180 are then fed to the second slicer inverter 120. In one example, the operation of the second slicer 120 is triggered during the raising edge of the half rate clock.

In summary, the first slicer inverter 118 receives VP_0 and VM_0 as input during the first half cycle and the second slicer inverter 120 receives VP_180 and VM_180 as input during the second half cycle. The outputs of the first slicer inverter 118 and the second slicer inverter 120 are shorted and presented as outputs VOP and VOM of the slicer 104. In one example, when the first slicer 114 is in reset phase, the second slicer 116 is in regeneration phase. Similarly, when the second slicer 116 is in reset phase, the first slicer 114 is in regeneration phase. Based on this scenario, the combined outputs of the first slicer inverter 118 and the second slicer inverter 120 provide full rate data throughput for each clock cycle. Now, referring to FIG. 3B, a timing diagram shows timing of various signals, according to an example of this disclosure.

Figure 3B:
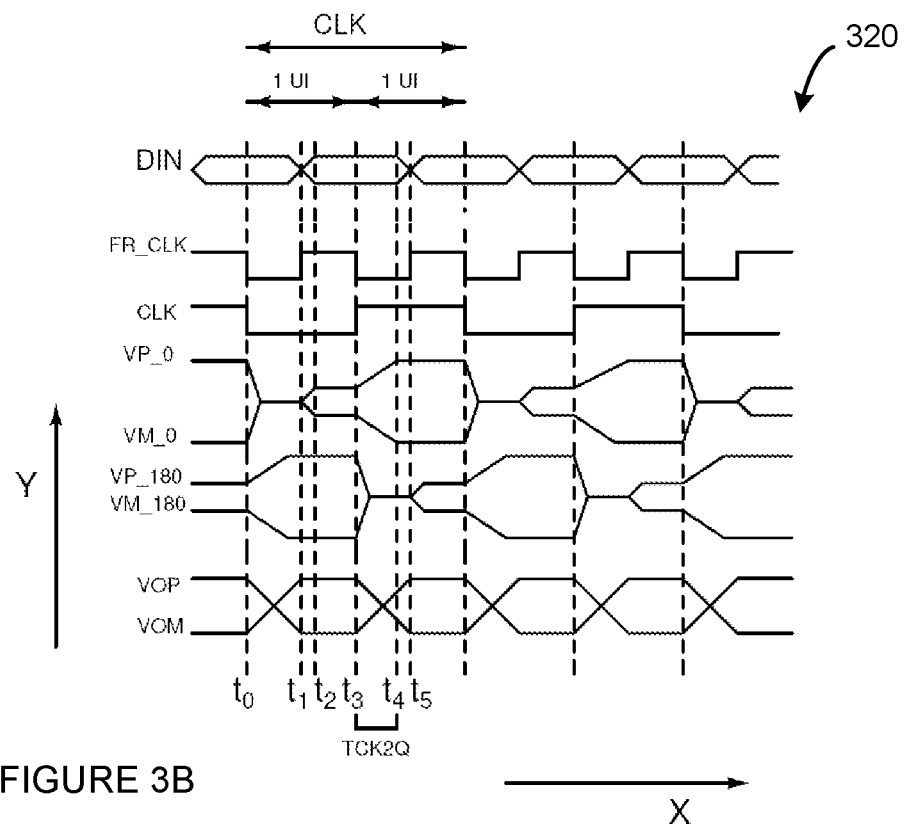
FIG. 3B shows a timing diagram for the first slicer and second slicer of the decision feedback equalizer of FIG. 1B, according to one aspect of the present disclosure.

Referring to FIG. 3B, an example timing diagram 320 is shown. The X axis of the timing diagram 320 shows the time and Y axis shows representative values of various signals. For example, timing graph DIN shows the input data. Timing graph FR CLK shows the full rate clock signal. Timing graph CLK shows the half rate clock signal. Timing graph VP_0 and VM_0 show the output of the first slicer 114. Timing graph VP_190 and VN_180 show the output of the second slicer 116. Timing graph VOP and VOM show the output of the slicer 104. 1 UI is the unit interval for one bit period. Comparing 1 UI to the CLK signal, we notice that one bit period (1 UI) is half the full period CLK of the half rate clock.

Now referring to timing graph VP_0 and VM_0, at time t0, VP_0 and VM_0 are at full value, for example, +Vdd (differential value), based on previous processing of the input data by the first slicer 114. The reset phase is initiated in the first slicer 114, by issuing a reset pulse to the reset circuit 304. The reset phase is initiated at the trailing edge of the CLK. The reset circuit brings the value of VP_0 and VM_0 to Vdd/2. By time t1, the reset phase is complete and the value of VP_0 and VM_0 are set to Vdd/2. Now, the first slicer 114 is ready to enter track phase.

Next, at time t1, the track phase starts in the track circuit 302a and 302b of the first slicer 114. The output (VP_0-VM_0) will be proportional to (SUMP-SUMM). The output of the input circuits 302a and 302b are tracked to the value proportional to the input, to establish an initial voltage level on the input nodes of the regeneration circuit 306, before regeneration begins. At time t2, the input values to the regeneration circuit 306 are ready at the output of the track circuit 302a and 302b. Next, at time t2, the regeneration circuit 306 is setup to process the input values and at time t3, the regeneration circuit 306 is ready to initiate the regeneration phase. Time (t3–t2) corresponds to the time Tsetup, as previously described with reference to FIG. 1.

At time t3, at the rising edge of the CLK, the regeneration circuit 306 initiates the regeneration phase and the output of the regeneration circuit 306 is raised to rail-rail voltage. Soon thereafter, at time t4, the output VP_0 and VP_M are available at the output of the regeneration circuit 306, as input to the first slicer inverter 118. Time (t4–t3) corresponds to the time $T_{CK2Q}$, as previously described with reference to FIG. 1A.

Now, referring to graph VP_180 and VM_180, output values of the regeneration circuit of second slicer 116 is shown. For example, at the raising edge of the CLK, at time t3, the second slicer 116 enters the reset phase. By time t5, the reset phase in the second slicer 116 is complete and the output values VP_180 and VM_180 are about Vdd/2. At the same time t4, as previously described, the first slicer 114 has completed the regeneration phase and the VP_0 and VM_0 are at rail to rail values. Thus, the first slicer inverter 118 and the second slicer inverter 120 either have the full value of VP_0 and VM_0 or the full value of VP_180 and VM_180 as input value. Also, by comparing the output of the first slicer 114 (VP_0 and VM_0) and the second slicer 116 (VP_180 and VM_180), we notice that the slicer 106 has processed two bit periods in one CLK clock cycle which corresponds to two FL_CLK cycles, thereby giving full data rate.

Figure 1B:
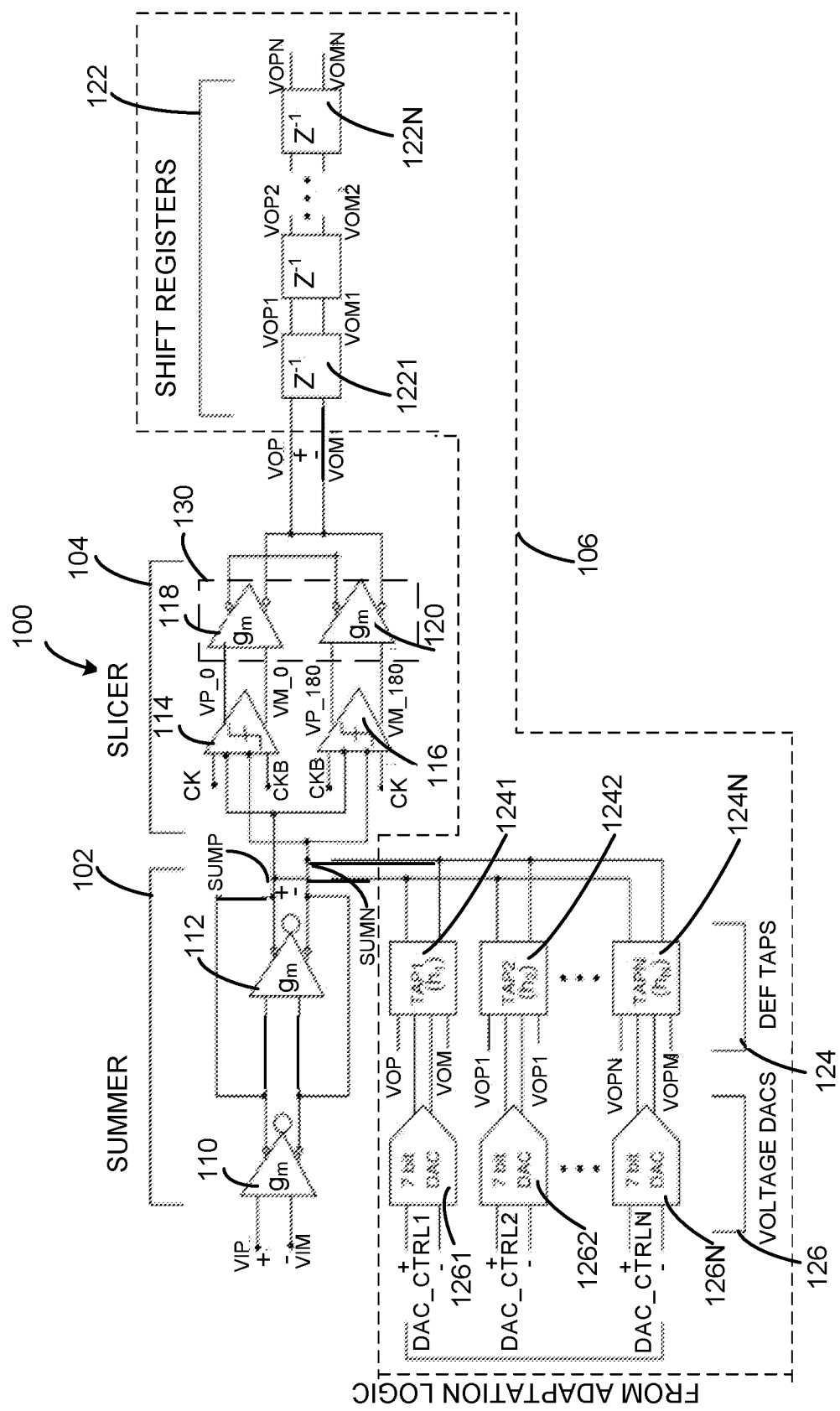
FIG. 1B shows detailed block diagram of the decision feedback equalizer of FIG. 1, according to one aspect of the present disclosure.
Figure 4:
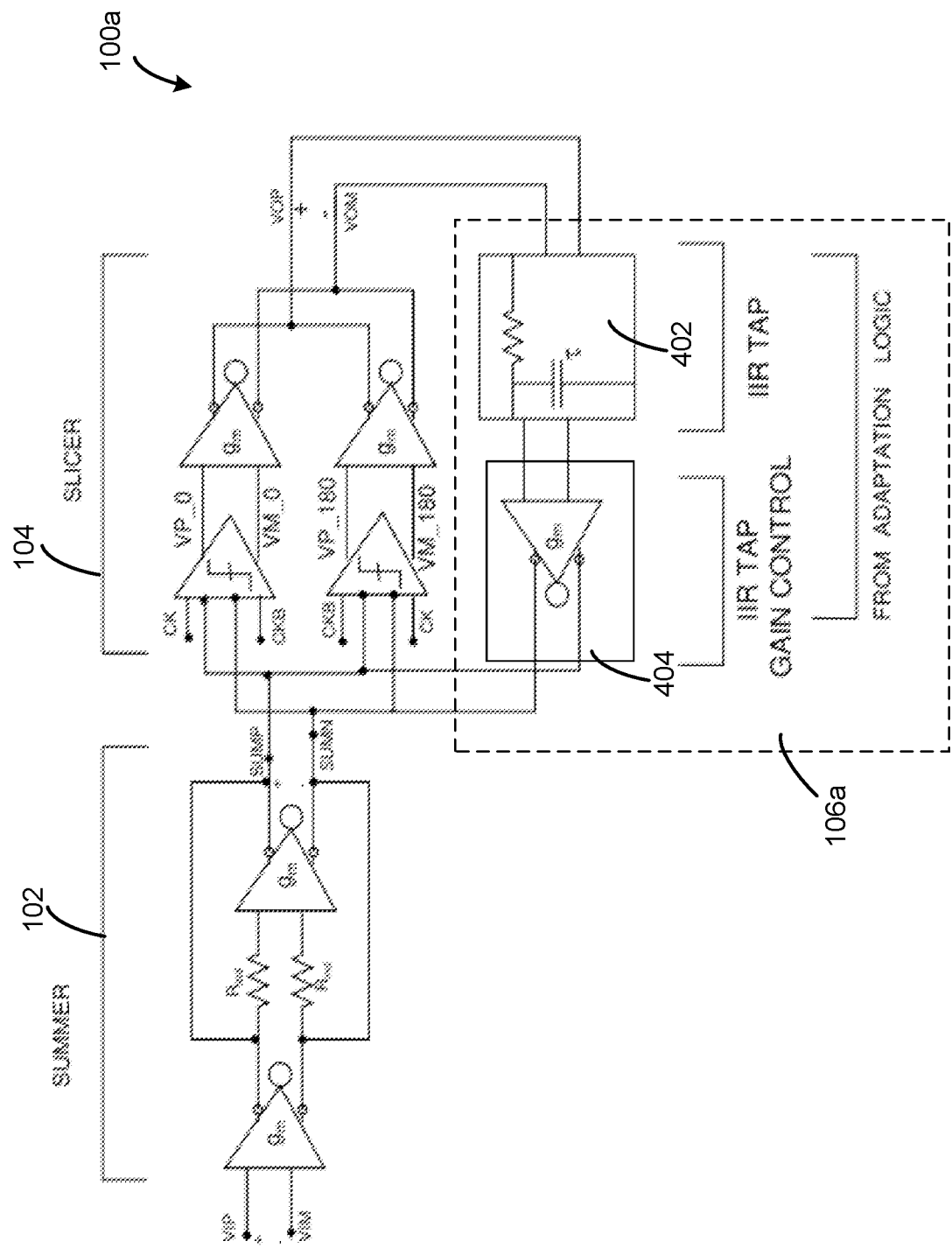
FIG. 4 shows an example alternate decision feedback equalizer, with an IIR based feedback circuit, according to one aspect of the present disclosure.

The example decision feedback equalizer 100 described with reference to FIG. 1B showed the feedback circuit 106 with a bank of discrete DFE taps 124. In some examples, an alternate feedback circuit mechanism can be used. Now referring to FIG. 4, an alternate decision feedback equalizer 100a is shown. The decision feedback equalizer 100a is similar to decision feedback equalizer 100 in that the summer 102, slicer 104 are similarly constructed. However, the feedback circuit 106a of the decision feedback equalizer 100a is constructed differently. Now, the construction of the feedback circuit 106a is described. In this example, the feedback circuit 106a includes an IIR tap 402 coupled to an IIR tap gain control 404, output of which is a correction signal that is fed back to the summer 102. The IIR tap 402 receives the output of the slicer 104 as input and generates an input to the IIR tap gain control 404 circuit. The feedback circuit 106a in one example, operates as an IIR filter. The IIR filters are configured to operate on full rate data inputs. Given the slicer 104 output is already at full rate, IIR filter as disclosed herein may be advantageously used as a feedback circuit 106a.

Figure 5A:
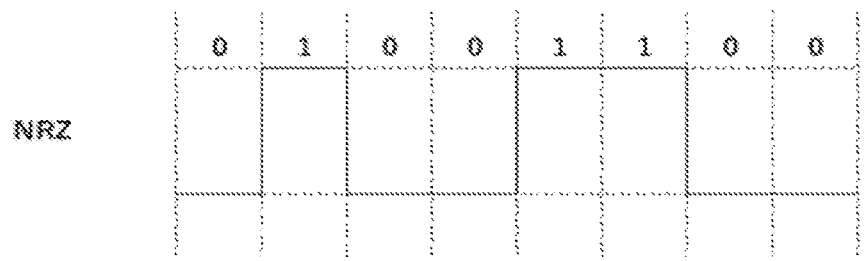
FIG. 5A shows an input data stream formatted according to a PAM-2 format.
Figure 5B:
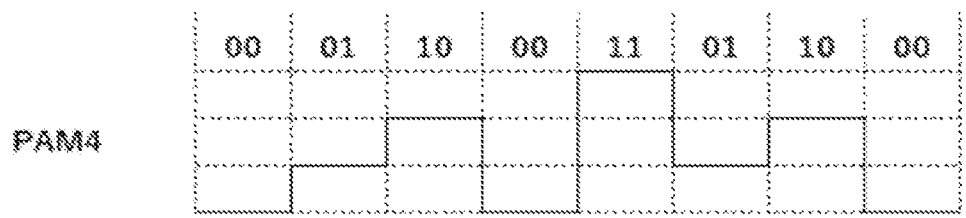
FIG. 5B shows an input data stream formatted according to a PAM-4 format.

FIG. 5A shows an example input data formatted according to a NRZ (non-return to zero) format (also referred to as Pulse Amplitude Modulation 2-level or PAM-2). The input data formatted according to the NRZ format has two levels. The decision feedback equalizer 100 as disclosed in FIG. 1B may be used to process input data formatted according to NRZ format. In some examples, the input data may be formatted in a multi-level signal modulation format. For example, FIG. 5B shows input data formatted in a multi-level signal modulation format. Specifically, the input data signal is modulated according to a PAM-4 format (Pulse Amplitude Modulation 4-level), with each data portion representing one of four voltage values, for example, 01, 10, and 11, based on the amplitude of the input data signal. The decision feedback equalizer 100 of FIG. 1B may be advantageously adapted to process input data formatted in a multi-level signal modulation format. Now, referring to FIG. 5C, an example decision feedback equalizer 100b configured to process input data formatted in PAM4 format is shown.

Figure 5C:
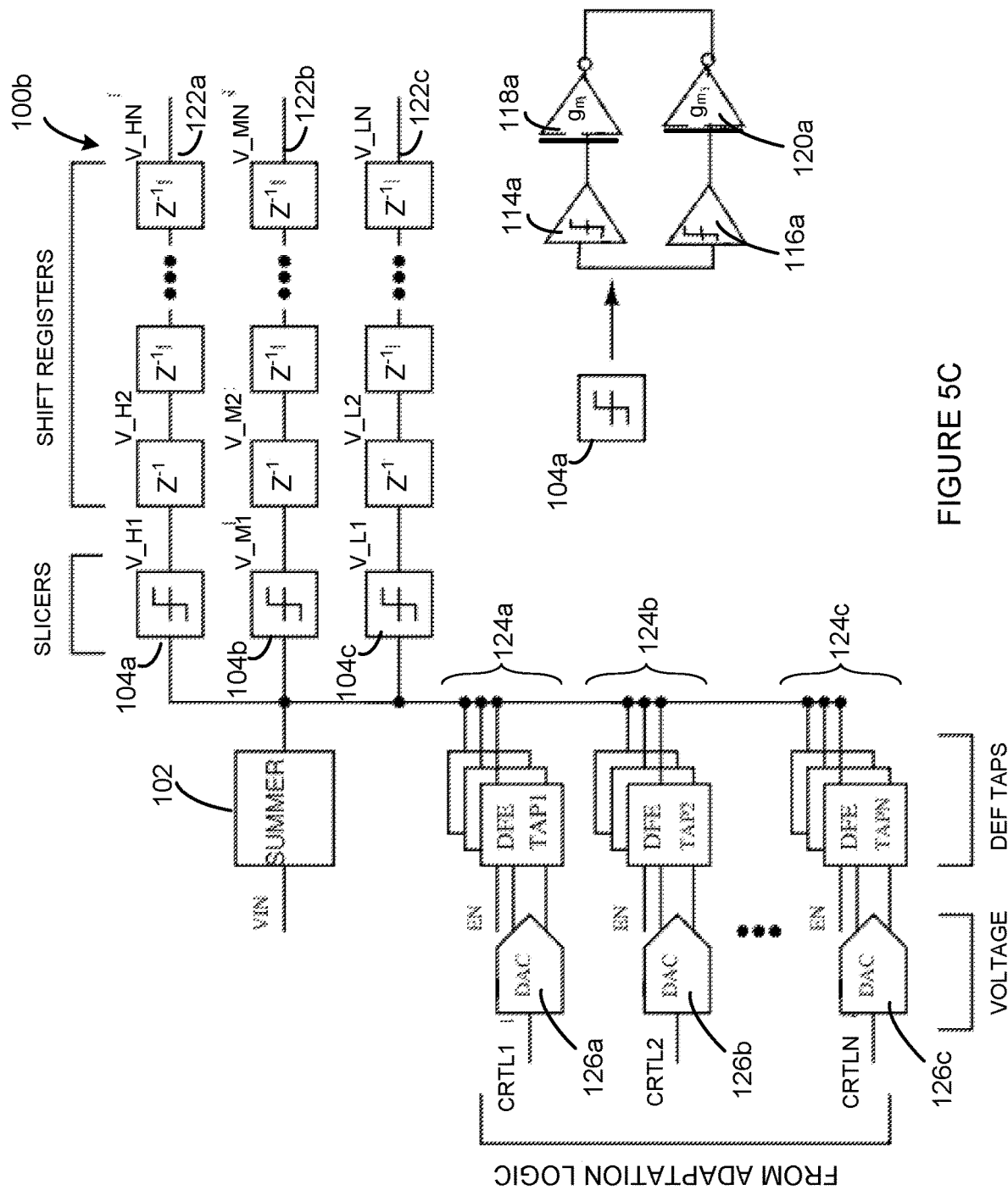
FIG. 5C shows another alternate decision feedback equalizer configured to process an input data stream formatted according to a PAM-4 format.

FIG. 5C shows decision feedback equalizer 100b. The decision feedback equalizer 100b includes a summer 102, a plurality of slicers 104a, 104b, and 104c, a plurality of shift register banks 122a, 122b, and 122c, and a plurality of banks of DFE taps 124a, 124b, and 124c. Each of the banks of DFE taps are coupled to a corresponding voltage DACs, for example, 126a, 126b, and 126c. Each of the slicers 104a, 104b, and 104c have a reference voltage associated with the PAM-4 voltage levels and each of these three slicers 104a, 104b, and 104c output a thermometer code corresponding to the input PAM-4 data. These outputs are fed to selective one of the plurality of banks of DFE taps 124a, 124b, and 124c. The construction of each of the slicers 104a, 104b, and 104c are similar to the construction of the slicer 104 of FIG. 1B. For example, slicer 104a includes a first subslicer 114a and a first subinverter 118a, a second subslicer 116a, and a second subinverter 120a. The first subslicer 114a, first subinverter 118a, second subslicer 116a, and the second subinverter 120a are similar to first slicer 114, first slicer inverter 118, second slicer 116, and the second slicer inverter 120 respectively.

Each of the DFE taps are controlled by the corresponding voltage DACs. The construction and operation of the banks of DFE taps 124a, 124b, and 124c are similar to the operation of the bank of DFE tap 124a previously described with reference to FIG. 1A. A collective correction signal is applied from the banks of DFE taps 124a, 124b, and 124c to the summer 102, as previously described with reference to FIG. 1A.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:
1. A decision feedback equalizer, comprising:
a summer;
a slicer including a first slicer and a second slicer; and
a feedback circuit,
wherein the summer is configured to receive an input signal and a correction signal from the feedback circuit to generate a summer output signal, wherein the first slicer and the second slicer are configured to receive the summer output signal as an input, sample the received input, and output a slicer output signal, wherein the feedback circuit is configured to receive the slicer output signal, and based on the slicer output signal, generate the correction signal, wherein the input signal is received at a first clock rate, wherein the first slicer and the second slicer sample the received input at a second clock rate approximately half the first clock rate, and wherein, the summer includes an input inverter based transconductor configured to receive the input signal and a unity inverter based load, wherein an input of the unity inverter based load is coupled to an output of the input inverter based transconductor, and wherein the correction signal from the feedback circuit is coupled to an output of the unity inverter based load.

2. The decision feedback equalizer of claim 1, wherein the input signal is a differential signal.

3. The decision feedback equalizer of claim 1, wherein the feedback circuit includes an infinite impulse response filter, wherein the infinite impulse response filter is configured to receive the slicer output signal to generate the correction signal to the summer.

4. The decision feedback equalizer of claim 3, wherein the input signal is a differential signal.

5. The decision feedback equalizer of claim 3, wherein the slicer further includes a pair of differential inverters configured to combine the output of the first slicer and the output of the second slicer to generate a full rate slicer output signal.

6. The decision feedback equalizer of claim 1, wherein the slicer further includes a pair of differential inverters configured to combine the output of the first slicer and the output of the second slicer to generate a full rate slicer output signal.

7. A decision feedback equalizer, comprising:
a summer;
a slicer including a first slicer and a second slicer; and
a feedback circuit,
wherein the summer is configured to receive an input signal and a correction signal from the feedback circuit to generate a summer output signal,
wherein the first slicer and the second slicer are configured to receive the summer output signal as an input, sample the received input, and output a slicer output signal,
wherein the feedback circuit is configured to receive the slicer output signal, and based on the slicer output signal, generate the correction signal,
wherein the input signal is received at a first clock rate,
wherein the first slicer and the second slicer sample the received input at a second clock rate approximately half the first clock rate, and
wherein, each of the first slicer and the second slicer includes an input circuit, a reset circuit, and a regeneration circuit, wherein, the input circuit is active during a track phase, the regeneration circuit is active during a regeneration phase, and the reset circuit is active during a reset phase.

8. The decision feedback equalizer of claim 7, wherein the input circuit is configured to receive the summer output signal as an input to generate a track output.

9. The decision feedback equalizer of claim 8, wherein the regeneration circuit is configured to receive the track output as an input and amplify the track output using a positive feedback to generate the slicer output signal.

10. The decision feedback equalizer of claim 7, wherein the reset circuit resets the slicer output signal.

11. The decision feedback equalizer of claim 7, wherein the input signal is a differential signal.

12. The decision feedback equalizer of claim 7, wherein the slicer further includes a pair of differential inverters configured to combine the output of the first slicer and the output of the second slicer to generate a full rate slicer output signal.

13. A decision feedback equalizer, comprising:
a summer;
a slicer including a first slicer and a second slicer; and
a feedback circuit,
wherein the summer is configured to receive an input signal and a correction signal from the feedback circuit to generate a summer output signal,
wherein the first slicer and the second slicer are configured to receive the summer output signal as an input, sample the received input, and output a slicer output signal,
wherein the feedback circuit is configured to receive the slicer output signal, and based on the slicer output signal, generate the correction signal,
wherein the input signal is received at a first clock rate,
wherein the first slicer and the second slicer sample the received input at a second clock rate approximately half the first clock rate, and
wherein the feedback circuit includes a plurality of DFE taps, each of the plurality of decision feedback equalizer (DFE) taps configured to receive a DFE tap correction signal, a polarity of the DFE tap correction signal is determined by the slicer output signal, and a plurality of DFE tap correction signals from the plurality of DFE taps are collectively fed as the correction signal to the summer.

14. The decision feedback equalizer of claim 13, wherein the slicer output signal is shifted in a shift register bank and a shifted slicer output is selectively fed to each of the plurality of DFE taps.

15. The decision feedback equalizer of claim 14, wherein the slicer is configured to process the received input in a multi-level signal modulation format, and each of the first and second slicers comprises a plurality of banks of sub-slicers configured to provide a plurality of sub-slicer outputs.

16. The decision feedback equalizer of claim 15, wherein, the feedback circuit further includes a plurality of banks of the plurality of DFE taps configured to receive the plurality of sub-slicer outputs to generate the plurality of DFE tap correction signals for each of the banks of the plurality of DFE taps, wherein the plurality of DFE tap correction signals from all of the banks of the plurality of DFE taps are collectively fed as the correction signal to the summer.

17. The decision feedback equalizer of claim 13, wherein a DFE tap of the plurality of DFE taps includes a pair of gated differential inverters, each gated differential inverter configured to receive the DFE tap correction signal, and the polarity of the DFE tap correction signal at the output of the gated differential inverters is selectively set by selectively gating one of the gated differential inverters based on the slicer output signal.

18. The decision feedback equalizer of claim 13, wherein the input signal is a differential signal.

19. The decision feedback equalizer of claim 13, wherein the slicer further includes a pair of differential inverters configured to combine the output of the first slicer and the output of the second slicer to generate a full rate slicer output signal.

* * * * *